(12) United States Patent
Dhere et al.

(10) Patent No.: US 12,497,640 B2
(45) Date of Patent: Dec. 16, 2025

(54) METHODS FOR SIMULTANEOUS FRAGMENTATION AND PURIFICATION OF BACTERIAL POLYSACCHARIDES

(71) Applicant: SERUM INSTITUTE OF INDIA PRIVATE LIMITED, Maharashtra (IN)

(72) Inventors: Rajeev Mhalasakant Dhere, Maharashtra (IN); Swapan Kumar Jana, Maharashtra (IN); Walmik Karbhari Gaikwad, Maharashtra (IN)

(73) Assignee: Serum Institute of India Private Limited, Pune Maharashtra (IN)

( * ) Notice: Subject to any disclaimer, the term of this patent is extended or adjusted under 35 U.S.C. 154(b) by 281 days.

(21) Appl. No.: 17/924,405

(22) PCT Filed: May 13, 2021

(86) PCT No.: PCT/IN2021/050455
§ 371 (c)(1),
(2) Date: Nov. 10, 2022

(87) PCT Pub. No.: WO2021/229604
PCT Pub. Date: Nov. 8, 2021

(65) Prior Publication Data
US 2023/0183765 A1    Jun. 15, 2023

(30) Foreign Application Priority Data

May 14, 2020    (IN) .............................. 202021020339

(51) Int. Cl.
*C12P 19/00*    (2006.01)
*A61K 39/00*    (2006.01)
(Continued)

(52) U.S. Cl.
CPC .............. *C12P 19/04* (2013.01); *A61K 39/02* (2013.01); *C08B 37/00* (2013.01)

(58) Field of Classification Search
CPC .................................. C12P 19/04; C08B 37/00
See application file for complete search history.

(56) References Cited

U.S. PATENT DOCUMENTS 8,398,985 B2 * 3/2013 Kapre ................. C08B 37/0003
424/193.1
2006/0228380 A1 * 10/2006 Hausdorff ............... A61P 31/04
424/244.1
(Continued)

FOREIGN PATENT DOCUMENTS

WO    WO-2015110942 A2 *    7/2015    .......... A61K 31/715
WO    2018203268 A1    11/2018
WO    2019152921 A1    8/2019

*Primary Examiner* — Nathan A Bowers
(74) *Attorney, Agent, or Firm* — BakerHostetler

(57) ABSTRACT

The present disclosure relates to alternative, cost effective, rapid and simple methods for bacterial capsular polysaccharide (CPS) manufacturing resulting in 1) simultaneous sizing and purification of CPS 2) high CPS yield, 3) improved CPS purity and removal of protein and nucleic acid contaminants, 4) CPS with preserved epitopic conformation and 5) stable and immunogenic polysaccharide-protein conjugate vaccines comprising of said size reduced and purified CPS The method particularly comprises subjecting crude/native bacterial polysaccharide to an oxidizing agent to obtain high purity, high yield and structurally intact CPS having optimal molecular size and other desirable CPS attributes. The method is amenable for commercial scale manufacturing of polysaccharide-protein conjugate vaccines.

16 Claims, 4 Drawing Sheets

(51) Int. Cl.
   *A61K 39/02*   (2006.01)
   *C08B 37/00*   (2006.01)
   *C12P 19/04*   (2006.01)

(56) References Cited

U.S. PATENT DOCUMENTS

| | | | | |
|---|---|---|---|---|
| 2006/0228381 | A1* | 10/2006 | Bahler | C12P 1/04 |
| | | | | 536/53 |
| 2007/0184071 | A1* | 8/2007 | Hausdorff | A61K 39/092 |
| | | | | 530/395 |
| 2007/0184072 | A1* | 8/2007 | Hausdorff | A61K 39/385 |
| | | | | 530/395 |
| 2007/0231340 | A1* | 10/2007 | Hausdorff | C07K 14/3156 |
| | | | | 530/322 |
| 2008/0102498 | A1* | 5/2008 | Bahler | C12P 19/04 |
| | | | | 435/101 |
| 2017/0021006 | A1 | 1/2017 | Watson | |
| 2018/0326073 | A1* | 11/2018 | Mooney | A61K 9/1271 |

* cited by examiner

METHODS FOR SIMULTANEOUS FRAGMENTATION AND PURIFICATION OF BACTERIAL POLYSACCHARIDES

CROSS-REFERENCE TO RELATED APPLICATIONS

This application is a National Stage Application of International Patent Application No. PCT/IN2021/050455, filed May 13, 2021, which claims priority to Indian Patent Application number 202021020339, filed May 14, 2020, the entire disclosures of both of which are hereby incorporated by reference as if set forth in their entirety herein.

FIELD

The present disclosure relates to methods for simultaneous fragmentation and purification of bacterial polysaccharides.

BACKGROUND

Polysaccharides represent essential, although highly structurally diverse, components on microbial cell surfaces. They are the primary interface with the host and play critical roles in survival strategies. Acting as shields against environmental assaults, they are actively investigated as attractive vaccine components. Polysaccharides represent prime components on bacterial cell surfaces. Produced by both pathogenic and non-pathogenic bacteria, often play critical roles in host-bacterium interactions. Occurring in the form of capsular polysaccharides (CPS), lipooligosaccharides (LOS), or lipopolysaccharides (LPS), they are important virulence factors contributing to, among other processes, surface charge, phase variation, resistance to serum-mediated killing, and more generally modulation of the host immune response. Whereas CPS may be present in both Gram-positive and Gram-negative bacteria, LPS is restricted to the outer membrane of the latter. LPS consists of three structural parts: the lipid A that serves as an anchor into the membrane, a core oligosaccharide (OS), and an O-specific polysaccharide (O-SP), which is the most surface-exposed and structurally diverse constituent.

Encapsulated bacteria such as *Streptococcus pneumoniae*, *Neisseria meningitidis*, and *Haemophilus influenzae* serogroup B (Hib) are a major cause of disease worldwide. Vaccine development against these organisms has targeted their capsular polysaccharides (CPS), as anti-capsular antibodies often protect against disease. There are a number of vaccines being developed against infectious diseases caused by bacteria, such as *Neisseria meningitidis*, *Salmonella* spp., *Streptococcus pneumoniae*, and *Haemophilus influenzae*.

Pneumococcal infections can lead to serious invasive diseases such as meningitis, septicaemia and pneumonia, as well as milder but more common illnesses such as sinusitis and otitis media.

There are >90 known serotypes of *S. pneumoniae*. The distribution of serotypes that cause disease varies over time and by age, disease syndrome, disease severity, geographical region and the presence of antimicrobial resistant genes. Of the estimated 5.83 million deaths among children <5 years of age globally in 2015, 294 000 (uncertainty range [UR], 192 000-366 000) were estimated to be caused by pneumococcal infections. Before the introduction of pneumococcal conjugate vaccines (PCVs) in the different WHO regions, 6-11 serotypes accounted for >70% of all invasive pneumococcal disease (IPD). The reported mean annual incidence of IPD in children aged <2 years was 44.4/100 000 per year in Europe and 167/100 000 per year in the United States of America. In comparison, the annual incidence of IPD in children <2 years in Africa ranged from 60/100 000 in South Africa to 797/100 000 in Mozambique. On average, about 75% of cases of IPD and 83% of cases of pneumococcal meningitis occur in children aged <2 years, but the incidence and age distribution of cases may vary by country, study method and socioeconomic status within countries. Case fatality rates from IPD in children can be high, ranging up to 20% for septicaemia and 50% for meningitis in low and middle income countries (LMICs).

The available 23-valent polysaccharide vaccine (23-PPV) is not effective in children less than 2 years of age, while the 7-valent conjugate vaccines (7-PCV) is effective in children, but has limited serotype coverage. To increase the serotype coverage, 10-valent conjugate vaccine containing the conjugates of the capsular polysaccharides from *S. pneumoniae* type 1, 4, 5, 6B, 7F, 9V, 14, 18C, 19F and 23F and protein D (a non-typeable *Haemophilus influenzae* protein), tetanus toxoid and diphtheria toxoid protein, and 13-valent conjugate vaccine containing the conjugates of capsular polysaccharides from *S. pneumoniae* type 1, 3, 4, 5, 6A, 6B, 7F, 9V, 14, 18C, 19A, 19F, and 23F and $CRM_{197}$ protein have been licensed for use. PNEUMOSIL® is manufactured by the Applicant at commercial scale for *Streptococcus pneumoniae* serotypes 1, 5, 6B, 9V, 14, 19A, 19F, 23F, 7F and 6A; with all the serotypes conjugated to $CRM_{197}$ as the carrier protein. The 10-valent pneumococcal conjugate vaccine covers over 70% of invasive pneumococcal-disease causing serotypes.

Various studies evaluating the clinical and bacteriological profiles for IPD across various parts of India showed the predominance of *S. pneumoniae* in the region. Furthermore, the highest IPD case fatality rates were observed for pneumococcal septicemia, with an unknown focus on infection, pneumonia, and meningitis In contrast to previously reported findings, the most common serotypes found in the study were 1, 3, 5, 19F, 8, 14, 23F, 4, 19A, and 6B. These serotypes accounted for 54.9% of IPD cases, which shows a clear need for the addition of the 13-valent pneumococcal conjugate vaccine (PCV13) to cover all prevalent serotypes and provide necessary protective serotype coverage in the country.

Capsular polysaccharides (CPS) are the primary cause of the virulence of these bacteria, and are often used in production of vaccines against these pathogens. Capsular polysaccharides can be used as such or may be coupled to a carrier protein (glycoconjugate).

Glycoconjugate vaccines are highly effective vaccines exhibiting T-dependent immune responses. A T-cell dependent protein carrier conjugated to the polysaccharide leads to the construction of a glycoconjugate. There is large body of evidence in the literature defining the immunogenic aspects of polysaccharide conjugate vaccines but details explaining the technical know-how for production and purification of the capsular polysaccharides are limited. The production of purified polysaccharide having desired quality and intact epitopic conformation is one of the key pre-requisite for effective conjugation with the carrier protein. The cost for cultivation and the purification of polysaccharides is generally high and involves multiple production and purification steps. Furthermore, the purified *Streptococcus pneumoniae* polysaccharide is required to meet the desired specifications e.g. as per WHO-TRS/BP/EP/IP wherein the protein and nucleic acid impurity content should be from 2 to 7.5% (w/w; dry basis) depending on the serotypes and 2% (w/w, dry basis), respectively.

Various methods are known for the extraction and purification of polysaccharides for use in vaccine manufacturing. The downstream processing of biological preparations is root cause for 20%-80% of the total production costs, the development of new downstream strategies is essential to reduce the production cost and allow the distribution of the vaccine for the entire population by the public health system.

The high purity and high yield requirement for polysaccharides used for vaccine manufacturing has led to the development of new purification methods based on cell lysis/inactivation of cells, enzyme treatment, precipitation/extraction, chromatographic techniques, sizing, filtration, and concentration.

One of the initial steps usually involved in the purification of capsular polysaccharides is cell lysis. Physical disruption methods for purification of capsular polysaccharides are known. The drawbacks of using physical disruption methods for lysing cells include, requirement of expensive equipment, may be cumbersome to use, reproducibility may vary, mechanical methods are generally not compatible with high-throughput and small volumes, protein denaturation and aggregation can occur, and cells disrupt at different times, so subcellular components may be subjected to ongoing disruptive forces.

A number of mechanical and non-mechanical techniques for cell lysis are known. Mechanical techniques, such as high pressure homogenizer and bead mills are not cell dependent and are highly efficient; however these techniques generate heat which could damage intracellular products, is expensive, and it is difficult to purify the lysed sample. Thermal lysis is easy to implement and is independent of the cell type; however it is expensive and damages proteins and intracellular components. Cavitation technique is independent of cell type, operates at a lower temperature and energy level. However, cavitation is an expensive technology and it is difficult to purify sample from debris. Osmotic shock can be used for extracting sensitive intracellular products, but this technique is not suitable for all cell types. Physical or mechanical methods of cell disruption have traditionally been the method of choice for cell lysis because it can be used with a wide variety of materials; and the amount of force applied and the duration of the treatment can easily be adjusted to suit the source material. This method includes grinding, mechanical disruption, freeze-thaw cycles, bead mills, liquid homogenization, and sonication. The disadvantages of mechanical techniques include the need for highly expensive equipment (e.g., French press, sonicator), increased risk for sample handling problems (since cells disrupt at different times, the released subcellular components are repeatedly subjected to disruptive forces), the reproducibility may vary since there is no standard terminology used in defining the handling of samples, increased risk of protein denaturation and aggregation due to localized heating (this can be avoided and/or minimized by pre-chilling the equipment and keeping the samples on ice at all times), some of the techniques are complicated and cumbersome to use, may not be compatible when working with small volumes and high-throughput. Mechanical techniques, such as high pressure homogenizer and bead mills, are not cell dependent and are highly efficient; however these techniques generate heat which could damage intracellular products, is expensive, and it is difficult to purify the lysed sample.

Non-mechanical techniques include physical (heating, osmotic shock, cavitation techniques), chemical (alkali & detergents) and biological method (enzyme) of cell lysis. Thermal lysis is easy to implement and is independent of the cell type; however it is expensive and damages proteins ad intracellular components. Cavitation technique is independent of cell type, operates at a lower temperature and energy level. However, cavitation is an expensive technology and it is difficult to purify sample from debris. Osmotic shock can be used for extracting sensitive intracellular products, but this technique is not suitable for all cell types. Alkaline lysis provide the advantage of being suitable for extraction of sensitive intracellular components including proteins, enzymes and DNA from all kinds of cells, however this is a time consuming process. Detergent lysis is suitable for protein release; however removal of chemical reagent from sample after lysis is difficult and the process has a lower efficiency as complete lysis is not possible. Enzymatic lysis is very specific and is suitable for extracting proteins; however complete lysis is not possible using enzymes, it is expensive, and it has to be used in combination with detergents for bacteria.

The bacterial polysaccharide from the lysed/inactivated cells is purified by a number of techniques including extractions, using solvents such as ethanol and phenol to remove nucleic acids and protein, followed by ethanol precipitation and centrifugation to remove endotoxins. One of the earliest methods for isolation of bacterial polysaccharide from serogroup A, B and C involved use of cationic detergent Cetavlon to precipitate the negatively charged polysaccharides from the whole culture, followed by the dissociation of detergent—polysaccharide complex using $CaCl_2$ extraction and centrifugation, ethanol precipitation is used for nucleic acid removal whereas the proteins are removed using treatment of polysaccharides with sodium acetate followed by homogenization with chloroform—containing butanol. Alternatively, use of hot phenol—water mixture is also reported. Final purification method involved polysaccharide precipitation with ethanol (4-5 times) and acetone. However, these methods are multi-step processes resulting in substantially low polysaccharide recovery. Further, these methods involve use of chloroform, phenol and large amount of ethanol. Use of chemicals like phenol can lead to unwanted structural changes in the polysaccharide or protein carrier and also result in undesirable toxic phenolic waste. In addition, handling and recycling of the toxic solvents and other components constitute safety and environmental risks.

In another method for purification of bacterial polysaccharide, phenol extraction is substituted with proteinase digestion using mixture of proteinase K, nagarse and trypsin; Tangential ultrafiltration in hollow fibre 100 KDa cut-off instead of ultracentrifugation; followed by extensive diafiltration, using a 100 kDa cut-off membrane, performed in 20 mM Tris-HCl buffer containing 0.5% of deoxycholate, to eliminate low molecular weight proteins and lypopolysaccharides (LPS). Despite the use of above modifications, the isolated polysaccharide preparation contained high impurity content of protein and nucleic acid.

A modified purification process for bacterial polysaccharide discloses a continuous flow centrifugation of the culture for removal of the cells; supernatant concentration by tangential filtration (100 kDa cut-off); addition of DOC, heating to 55° C. and tangential filtration (100 kDa cutoff); anion exchange chromatography (Source 15Q) and size exclusion chromatography (Sepharose CL-4B).

Another process for reduction or removal of endotoxin from biotechnologically derived therapeutic compositions involves incubation with non-ionic detergent prior to chromatographic purification. The chromatographic medium is anion exchange material and the chromatographic purification involves use of sodium chloride salt for washing.

Removal of endotoxins from biological macromolecules can be carried out by treatment with non-ionic detergent without incubation period prior to the chromatographic purification. The chromatographic medium is anion exchange material and the anion exchanger retains the macromolecules and the purified macromolecule is eluted from the exchanger.

Use of CTAB, ethanol, proteinase K, activated carbon and gel filtration for removal of impurities during purification of bacterial capsular polysaccharide is known. However, this multistep process results in polysaccharide recovery loss and further the use of activated carbon may give rise to undesirable leachables. The major disadvantage of gel filtration chromatography is limited sample size that can be applied at one time. The volume of sample is critical for separation and should not exceed 1-10% of the total column volume. CTAB has been utilized for selective precipitation of polysaccharide, however CTAB is a hazardous chemical. Further ethanol is required for removal of CTAB from precipitated polysaccharides.

Another process involves subjecting fermentation broth to concentration and diafiltration followed by ammonium sulphate precipitation and centrifugation. This is followed by benzonase treatment, hydroxyapatite chromatography and diafiltration in sequence.

Protein contaminants from polysaccharides may be removed using sodium deoxycholate (DOC) and chromatography steps, wherein the protein impurities are precipitated without precipitating capsular polysaccharides.

Release of capsular polysaccharide from bacterial cells, comprises the step of treating the cells with acid. Other processing steps may be included in the process, such as enzymatic treatment, e.g. to remove nucleic acid, protein and/or peptidoglycan contaminants; diafiltration, e.g. to remove low molecular weight contaminants; anion exchange chromatography, e.g. to remove residual protein; and concentration.

Protein contaminants from the bacterial harvested extract may be removed using zinc acetate/ammonium sulphate/sodium citrate. It also includes use of enzymes like benzonase, proteinase K or nagarse for degradation of residual proteins and/or nucleic acid materials, followed by chromatographic purification. Another process for removing impurities from bacterial capsular polysaccharide involves incubation at 50-60° C. in presence of anionic detergents like sodium deoxycholate or HEPES, deacetylation of crude polysaccharides using 0.5-1.5 M NaOH at 50° C., and further purification by diafiltration and Hydrophobic Interaction Chromatography (HIC).

Use of non-ionic detergent, such as Triton-X100/114 for purification of bacterial polysaccharides is also known. However, Triton persists in the extraction phase and elimination requires additional extensive washing steps to remove all the residues.

Another process for purification of bacterial capsular polysaccharides comprises use of CTAB, ethanol, DOC, Capto Adhere {multimodal anion exchange chromatography}, Capto DEAE (Weak anion) and Sephadex G25, wherein endotoxin content is less than 25 EU/mg, Protein content less than 10 mg/g, nucleic acid content between 1-7 mg/g. MMLC (Multimodal liquid chromatography) could be undesirable especially if it was not intentionally induced. The electrostatic interaction between free silanol groups and the analytes in RPLC leads to peak tailing of basic compounds. The hydrophobic interaction in ion exclusion chromatography (IELC) causes prolonged retention of aromatic compounds. Moreover, the chromatographic system can be more complicated such as in 2D-LC where a switching valve and an extra pump are required. The mobile phase compatibility with the separation modes should be checked, otherwise, a purge and dry sequence has to be employed which makes the separation process more sophisticated. A number of examples of mixed-mode stationary phases have been reported. Some early examples of mixed-mode columns are soft-gel anion-exchange resins, like DEAE-Sephadex or -cellulose. A disadvantage of these columns is that only low pressure is allowed across these columns. Another example is the RPC-5 column. This type of column consists of a non-porous spherical polymer support (polychlorotrifluoroethylene, Plaskon 2300), which is coated with trioctylmethyl ammonium chloride. General drawbacks of these columns are bleeding of the ammonium groups from the column, and the non-porous support which is not of a constant quality. The development of mixed mode chromatography protocols can place a heavy burden on process development since multi-parameter screening is required to achieve their full potential. Method development is complicated, unpredictable, and may require extensive resources to achieve adequate recovery due to the complexity of the chromatographic mechanism.

There are various methods known for the purification of *Streptococcus pneumoniae* capsular polysaccharide (CPS). Traditional methods for CPS purification involve more than 10 steps using ethanol precipitation, Cetavlon precipitation, phenol extraction, purification by activated charcoal and ammonium sulfate precipitation. The main disadvantages of these methods are the numerous steps involved and the low yield of the polysaccharide. Also, phenol is a toxic and corrosive reagent. Though, during preliminary purification polysaccharides can be precipitated from their aqueous solution with organic solvents, such as acetone, acetonitrile or ethanol, sometimes with the aid of sodium chloride, the disadvantage of this method is the possibility of co-precipitation of impurities Ammonium sulphate precipitation is not suitable for single step purification but must be combined with other methods if pure antibody preparations are needed. Disadvantages of ammonium sulfate precipitation include, since ammonium sulphate has no buffer effect and the salt solution must be checked for pH changes, ammonium sulphate contains nitrogen and hence the salt has to be removed before protein concentrations can be established, therefore additional steps are involved when ammonium sulphate precipitation is performed, low yields are observed, prolonged stirring required to solubilize the salt leading to denaturation of proteins, localized high concentrations of ammonium sulphate salt may cause unwanted proteins to precipitate, ammonium sulphate can easily be removed by dialysis of protein solutions against large volumes of desired buffer and although dialysis is common method of salt removal, it is somewhat time consuming.

Chromatographic techniques in combination with other steps are also used for obtaining purified capsular polysaccharides. Activated Carbon powder (PCA) and Activated Carbon granular (GCA): PCA and GCA were used as medium for packing glass columns. From the experiments it was possible to argue that Carbograph cartridges gave the best results, providing for a fine and reproducible technique for the purification of K4d from 0-Chain. Carbon powder resulted to be so fluffy that it could not be removed by centrifugation. All others attempt to remove it from samples failed. Small amount of carbon powder was found in samples also after GCA extraction. Furthermore, in order to set up a protocol suitable for an industrial scale up process, it should be considered that activated carbon is expensive, thus making regeneration economically desirable but not easy to perform on a large scale. Another disadvantage with activated carbon is the high emissions of sulphur dioxide generated from the heating process in manufacturing carbon from coal, and with the increasing demands for environmental protection it could be suitable to look at another viable procedure ecologically compatible. Further, activated carbon is non-selective, quite expensive, and the higher the quality, the greater the cost. The regeneration of saturated carbon by thermal and chemical procedure is also expensive, and results in loss of the adsorbent.

Methods using affinity chromatography for purification of CPS are known which provides high purity and few steps; however this method is difficult for scale up and is optimized for only S. pneumoniae serotype 14.

CPS purification using ultrafiltration, ethanol precipitation, and protease/nuclease treatment are also known. Though this method provides good recovery, the enzyme step addition is optimized for only 2 pneumococcal serotypes, namely, serotypes 6B and 23F. Further, the use of enzymes in organic solvent has also disadvantages such as the unfavorable effects of the organic solvents on enzyme activity and stability. Enzymes are highly sensitive to changes in physical and chemical conditions surrounding them. They are easily denatured by even a small increase in temperature and are highly susceptible to poisons and changes in pH. Therefore, the conditions in which they work must be tightly controlled. The enzyme substrate mixture must be uncontaminated with other substances that might affect the reaction.

Purification process involving pH precipitation and ethanol precipitation resulting in good recovery with fewer steps are known; however these processes are optimized for only S. pneumoniae serotype 19A. Further, purification process involving ultrafiltration, ethanol precipitation, and aluminium phosphate co-precipitation resulting in good recovery and endotoxin elimination is known; however this process is optimized for only five S. pneumoniae serotypes.

Still further, simple process involving ultrafiltration, trichloroacetic acid (TCA) precipitation, ethanol precipitation, and optionally anion exchange chromatography are known resulting in good yield, which can be easily scaled up; however the same is optimized for only one S. pneumoniae serotype (serotype 14).

Other reported methods for isolating polysaccharides from microorganisms rely on treatment of cells with hot phenol. Phenol separates the polysaccharides into the aqueous layer. The aqueous layer is concentrated by ultrafiltration to yield crude polysaccharide fractions which are then purified by chromatography. These methods are laborious and costly, as the necessity to eliminate toxic molecules associated with the cell wall (e.g., lipid A endotoxin, lipoteichoic acids and muramyl peptides) requires the use of expensive enzymes and complicated chromatography to degrade and remove toxins. The hot phenol-water technique may also give rise to some degradation of LPS during the isolation procedure, including the loss of ester-linked fatty acids.

Depth filters are also known to be used for purification of bacterial polysaccharides, especially for removal of proteins and cell debris that has not precipitated during centrifugation.

An alcohol-free process for obtaining purified pneumococcal polysaccharides comprises lysing the cells with deoxycholate, ultrafiltration, precipitating using cetrimonium bromide, ion exchange chromatography and hydroxy apatite chromatography. Hydroxyapatite (HA) chromatography is a traditional example of mixed-mode chromatography in which protein can bind to resin via either HA-phosphoryl (cation-exchange) or HA-calcium residues (metal affinity). HA used for recombinant protein purification (e.g., antibodies) include ceramic HA (CHT by Bio-Rad Laboratories) CHT ceramic hydroxyapatite and CHT Fluorapatite are mix-mode medias. Mechanical instability, low reusability, and high costs are some of disadvantages of CHT chromatography.

Another method for *Streptococcus pneumoniae* bacterial polysaccharide purification utilizing phenol, CTAB, activated charcoal and affinity chromatography is known. However, the polysaccharide yield reported is very low (from 2% to 55%).

A single-step purification process comprising a chromatographic step involving contacting the target substance to a chromatography matrix, washing bound target with a buffer containing a combination of a lyotropic agent or an organic solvent, a detergent and a salt component, desorbing bound target from chromatography matrix with an eluent and collecting the desorbed target substance is also known.

An important factor considered during polysaccharide-protein conjugates is the molecular size of the polysaccharide. Bacterial polysaccharides are usually subjected to several types of fragmentation for making them amenable for conjugation.

Several methods of partial depolymerization of bacterial polysaccharides are known which yield fragments suitable for conjugation, such as acid hydrolysis, alkaline degradation, ozonolysis, enzymatic hydrolysis, sonication, electron beam fragmentation. A process for making capsular polysaccharides from *Streptococcus pneumoniae* comprises a size-reducing treatment selected from thermal treatment, sonic treatment, endolytic enzyme treatment, and physical shear, and precipitation with isopropyl alcohol.

Depolymerization methods reported previously often result in total or partial destruction of the characteristic epitopes by the loss of chemical functional groups essential for the antigenic specificity. Another limitation is that it is not always possible to obtain fragments of relatively homogeneous size, whereas pharmaceutical practice requires homogeneous products, of constant and standardised quality.

Conventionally, the polysaccharides are sized to the desirable molecular weight in a separate step using techniques, such as microwave, sonication, microfluidization, and high pressure homogenization (for example at 1000-1500 bar, for 1 to 20 cycles). However, microwave technique results in high consumption of power and also the polysaccharide structure is easy to be destroyed. High pressure homogenization is expensive; results in generation of heat, which could damage the product of interest; and also further time-consuming methods are required to purify the product. Sonication results in generation of heat, which may degrade the product of interest.

In the case of fragmentation by ultrasound, it has for example been shown that the terminal phosphate groups of the polysaccharides (*H. influenzae* type B) are lost by ultrasound treatment. This may lead to a fear that phosphate groups in the branched position on the polysaccharide chains are likewise removed during such a treatment. Moreover, although fragments of relatively homogeneous size can be obtained using ultrasound, the production of fragments of sufficiently small size by the ultrasound method requires a very long treatment time which may cause, among other disadvantages, a rapid deterioration of the equipment. Its efficiency being limited, the application of ultrasound on an industrial scale is to be excluded.

Microfluidization has improvements over conventional homogenizers, however it has very high processing cost. Ozonolysis can only be used with polysaccharides containing β-D-aldosidic linkages, and only few endoglycanases have been isolated till date. However, methods such as microwave utilize high amount of power and may have a deleterious effect on labile antigenic epitopes of polysaccharides. Further, sonication generates heat, has complex mechanism and expensive fabrication process and the excessive heat generation during sonication may denature polysaccharides.

Another method for sizing bacterial polysaccharides includes addition of hydrochloric acid (at a final acid concentration of 0.1 M) to a solution of the capsular polysaccharide, and incubation at 45±2° C. The solution is then cooled to a temperature in a range of about 21° C. to about 25° C., and 1M sodium phosphate is added thereto to a final pH of 6.0±0.1, thereby stopping hydrolysis. However, HCl is a caustic chemical and highly corrosive, which may cause severe damage to tissues, such as burning, on contact.

Finally, the use of enzymatic depolymerisation of polysaccharides is limited to the polysaccharides for which appropriate enzymes are known. This major disadvantage is however inherent in the highly specific nature of enzymes towards their substrate.

One of the methods uses carbonate/bicarbonate buffer, which may cause size reduction in chain length for base-labile polysaccharides (CPS), secondly carbonate-buffer may not be suitable medium for conjugation reaction hence buffer exchange step will be additionally required to be incorporated. Such additional processing affects recovery of CPS available for conjugation reaction. However CPS obtained shows high polydispersity and such sizing method can damage epitopes of capsular polysaccharide antigen resulting in low immunogenicity for polysaccharide-protein conjugates.

Further in addition to the carbohydrate components, there are phosphate, acetate, and pyruvate sidegroups in several of the CPS of interest, with some of these being immunodominant features especially in type 4 capsular polysaccharides, as its removal gives rise to marked changes in immunological specificity.

Vaccine production is extremely challenging due to complexity of the vaccine molecule itself and rigorous safety norms to be complied, in confluence with the demand to supply low cost and efficacious vaccines catering to a large population especially from low and middle income countries. Purification process is vital in vaccine production and accounts for the major part of production expenses. As described herein above, majority of the purification processes being used currently are multi-step, time and labour intensive, expensive, provide low polysaccharide recovery (of about 50%) and high impurity content (15% protein and 25% nucleic acid).

It is seen from the aforestated, that numerous methods are disclosed for obtaining purified bacterial polysaccharide. These methods involve chromatography, low pH precipitation, alcohol precipitation, salt precipitation, filtration, alcohol free process, etc., for removal of impurities. However, these methods are tedious and need multiple processing steps. Some have shown minimal reduction in impurities with subsequent difficulty in removing soluble proteins to meet purified polysaccharide specifications and therefore there is high burden of removal of contaminating soluble protein particularly for certain serotypes. Phenol is toxic and chromatography methods need more technical inputs and costly resins, which makes the process commercially not economical. Hence, there is a need for improved methods for the removal of protein impurities from complex cellular lysates. Further, certain bacterial strains produce large and viscous polysaccharides, which are released in the growth medium during lysis. The high viscosity hinders the filtration steps resulting in insufficient removal of the proteins from the polysaccharides.

Previous attempts at improving purification processes for pneumococcal polysaccharides have included, for example, pH manipulation during fermentation and recovery and solvent and detergent precipitation. However, the removal of impurities in these processes is labor intensive and involves costly steps. Also, the desired level of protein level is difficult to attain due to the physical and chemical attributes of soluble proteins.

Use of alcohol during pneumococcal polysaccharide purification process results in operational problems and is an extremely time consuming process. Using bulk chromatographic steps such as cation/anion exchange and hydrophobic/hydrophilic interaction to initially purify the polysaccharides does not provide the desired purity and yield. Use of ethanol during pneumococcal polysaccharide purification is associated with operational problems, such as requirement of expensive flame proof facility as use of ethanol is hazardous. Also, the large amount of ethanol used results in large amounts of effluent, which further necessitates time consuming and expensive steps. Alcohol-free processes using cationic detergents to remove protein and nucleic acid contaminants via precipitation fail to precipitate all the polysaccharides when low concentrations of detergent are used and further it is seen that some polysaccharides are co-precipitated with the contaminants but are subsequently re-suspended into buffer that prevents the contaminants from re-solubilizing. It is known that solubiliation of the polysaccharides from the detergent is cumbersome.

Though, the above mentioned methods result in removal of protein and nucleic acid contaminations from the polysaccharides, there are several drawbacks associated with these methods. While the use of enzymes help in degradation of proteins and nucleic acid contaminants, the removal of enzymes and hydrolyzed material is tedious and may result in loss of the product of interest decreasing the final yield of the polysaccharides. The efficiency and consistency of enzymes depends upon stability of the enzyme at different environmental conditions such as pH, temperature and duration. Furthermore, regulatory agencies have restricted the use of animal enzymes in products for humans because of the risk of contamination with prions. The use of enzymes will introduce more regulatory issues in the cGMP framework, such as the origins of enzymes (from animal or recombinant), and enzyme activity variations between different vendors and lots. Also utilization of such enzymes incurs significant costs as part of commercial scale operations.

Use of ammonium sulphate precipitates protein and nucleic acid contaminants. However, at times it also precipitates capsular polysaccharides, resulting in loss of total polysaccharide. Also reagents, such as phenol release intracellular contaminants into the extracellular media. As a consequence, additional purification steps are required to eliminate these contaminants, which increase the complexity of the process, decreasing the final yields and increasing the economic costs.

Chromatographic techniques like Size Exclusion Chromatography (SEC), Ion Exchange Chromatography (IEC), and Hydrophobic Interaction Chromatography (HIC) have been successfully used for isolation of bacterial polysaccharides with effective removal of protein and nucleic acid contaminants Use of chromatographic techniques involves multistep labour and time consuming sample preparation, involves scalability issues, drastically compromises the recovery of the capsular polysaccharides and thus is not a feasible low cost option for industrial scale downstream processing. Further, chromatographic techniques, such as Size Exclusion Chromatography (SEC), do not provide an accurate representation of the High Molecular Weight (HMW) forms present in a sample due to filtration or non-specific binding of the HMW forms by the column. Ion exchangers are quickly polluted, which considerably reduces the exchange capacity. Examples of this include pollution by micro-biology (e.g. film-forming bacteria) and pollution by suspended matter. Another disadvantage is the relatively high operational costs for, among other things, the regeneration fluid. After use, these regeneration fluid forms a major concentrate flow that needs to be disposed of.

Therefore, there is an urgent unmet need for alternative, cost effective, rapid, platform based, simple and improved sizing and purification methods for bacterial capsular polysaccharide manufacturing for 1) obtaining high yield, 2) improving CPS purity in terms of protein and nucleic acid, 3) obtaining CPS with low polydispersity, optimal molecular weight and preserved pyruvate group and subsequent preparation of stable and immunogenic polysaccharide-protein conjugate vaccines.

Objects

An object of the present disclosure is to ameliorate one or more problems of the prior art or to at least provide a useful alternative.

An object of the present disclosure is to provide a method for obtaining purified bacterial polysaccharide.

Another object of the present disclosure is to provide a method of lysis and subsequent rapid purification of bacterial polysaccharides.

Yet another object of the present disclosure is to provide a simple and cost effective method for sizing bacterial polysaccharides.

Still another object of the present disclosure is to provide a simple and cost effective method for obtaining purified bacterial polysaccharide, which does not utilize phenol, triton, enzymes, CTAB, activated carbon, chromatography, ammonium sulphate or ethanol.

Yet another object of the present disclosure is to provide a method comprising minimum steps for obtaining purified and sized bacterial polysaccharide.

Another object of the present disclosure is to provide a method for obtaining purified bacterial polysaccharide having high polysaccharide recovery (at least 60%) and low impurity content (proteins 0.2% and nucleic acids 0.3%).

Yet another object of the present disclosure is to provide efficient and reproducible methods for bacterial capsular polysaccharide sizing.

Another object of the invention is obtaining low polydispersity polysaccharide, wherein such low polydispersity polysaccharide (CPS) gives conjugate with narrow distribution of size. This helps to have better conjugation process control, higher recoveries when concentrated on a membrane as well as ease in purification of crude polysaccharide protein conjugate. Most importantly by applicant's method the polysaccharide antigen remains structurally intact, i.e. the epitopic conformation is retained which ensures that resultant polysaccharide-protein conjugate shows optimal immunogenicity.

Still another object of the present disclosure is to provide immunogenic compositions comprising the purified bacterial polysaccharide.

Other objects and advantages of the present disclosure will be more apparent from the following description, which is not intended to limit the scope of the present disclosure.

SUMMARY

The present disclosure provides a method for obtaining purified and sized bacterial polysaccharides. Known methods for purification of bacterial polysaccharides use multiple steps, expensive reagents, are labour intensive, result in low yields of the polysaccharides and generate large amounts of effluent. Further, it is observed that the use of harsh reagents (such as acids, phenols, ethanol CTAB), multiple chromatographic methods and cumbersome down stream processes lead to high polydispersity and loss of pyruvate groups in the purified polysaccharides ultimately leading to loss of stability and immunogenicity of the polysaccharides. The inventors of the present disclosure have surprisingly found that using the present method provides purified bacterial polysaccharides (CPS) having:

optimal molecular size;
optimal polydispersity resulting in improved conjugation efficiency;
optimal hexosamine content;
optimal pyruvate content resulting in intact and immunogenic CPS;
reduced protein and nucleic acid impurities; and
high yield of polysaccharides, leading to enhanced stability and immunogenicity of compositions comprising the purified polysaccharides obtained by the method of the present disclosure.

The method of the present disclosure involves inactivation of fermented bacterial culture and collection of the resultant harvest. The obtained harvest is treated with an oxidizing agent ($H_2O_2$) to yield sized and purified bacterial polysaccharide having desired characteristics.

BRIEF DESCRIPTION OF THE ACCOMPANYING DRAWING

The present disclosure will now be described with the help of the accompanying drawing, in which.

DESCRIPTION

Figure 1:
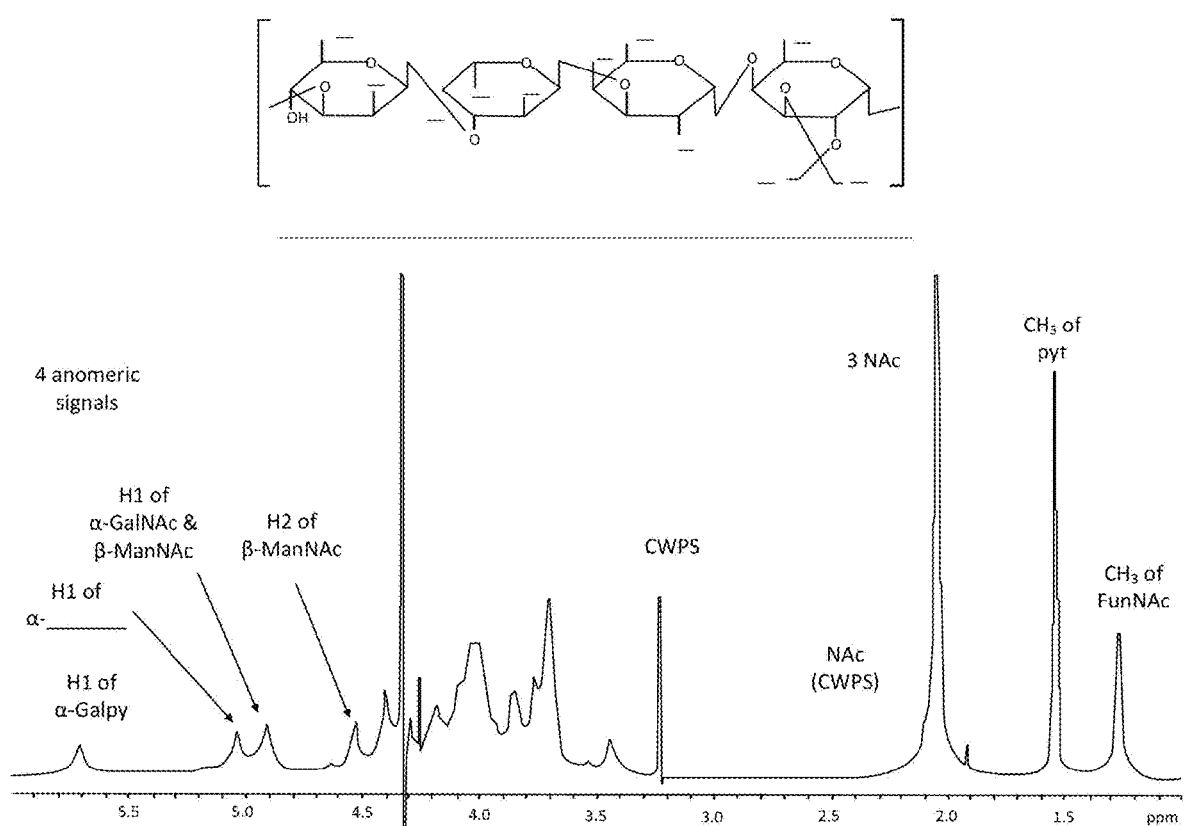
FIG. 1 illustrates the literature $^1H$ NMR spectrum of purified S. pneumoniae polysaccharide for serotype 4.

Although the present disclosure may be susceptible to different embodiments, certain embodiments are shown in the following detailed discussion, with the understanding that the present disclosure can be considered an exemplification of the principles of the disclosure and is not intended to limit the scope of disclosure to that which is illustrated and disclosed in this description.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an", and "the" may be intended to include the plural forms as well, unless the context clearly suggests otherwise. The terms "comprises", "comprising", "including", and "having", are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

The present disclosure envisages a simple and cost effective method for obtaining size reduced and purified bacterial polysaccharides. The purified polysaccharides may be used as antigens, or may be used for production of antibodies, and vaccines. The purified polysaccharides may be used alone or may be conjugated to carrier proteins.

In an aspect of the present disclosure, there is provided a method for obtaining purified bacterial polysaccharides. The method comprises removal of impurities such as proteins and nucleic acid from the crude polysaccharides and sizing of the polysaccharides to obtain purified bacterial polysaccharides having the desired molecular size.

In an embodiment of the present disclosure, the method comprises the following steps:
  providing a fermentation harvest comprising bacterial cells expressing a polysaccharide;
  inactivating the bacterial cells in the fermentation harvest by inactivating agent to the fermentation harvest;
  centrifuging the fermentation harvest comprising the inactivated bacterial cells to separate the cell free supernatant;
  concentrating and filtering the cell free supernatant; and
  treating the concentrated and filtered cell free supernatant with an oxidizing agent;
  centrifuging the above mixture to collect the supernatant; and
  diafiltering and concentrating the supernatant to obtain the sized and purified polysaccharide having molecular weight in the range of 5 kDa to 900 kDa (SEC-HPLC), polydispersity in the range of 1 to 5, hexosamine content between 10% and 55%, pyruvate content greater than 10%, protein content less than 2%, nucleic acid content less than 2%, immunoreactivity in the range of 40% to 95%, and % yield of polysaccharide in the range of 60% to 95%.

The method of the present disclosure may be used for obtaining purified polysaccharides from any bacteria. In accordance with the embodiments of the present disclosure, the polysaccharides may be derived from bacteria selected from the group consisting of, but not limited to, *Streptococcus* spp. such as Group A *Streptococcus*, Group B *Streptococcus* (group Ia, Ib, II, III, IV, V, VI, VII, VII, VIII, and IX); *Streptococcus pneumoniae, Streptococcus pyogenes; Streptococcus agalactiae; Streptococcus viridans; Salmonella* spp. such as, *Salmonella typhi; Salmonella paratyphi; Salmonella enteritidis; Salmonella typhimurium; Shigella* spp. such as *Shigella sonnei, Shigella flexneri, Shigella dysenteriae; Shigella boydii; E. coli; Neisseria meningitidis* (serotypes such as A, B, C, D, E29, H, I, K, L, M, W135, X, Y, Z, etc); *Neisseria gonorrhoeae; Haemophilus influenzae; Haemophilus* pneumonia; *Helicobacter pylori; Chlamydia pneumoniae; Chlamydia trachomatis; Ureaplasma urealyticum; Mycoplasma pneumoniae; Staphylococcus* spp. such as *Staphylococcus aureus, Staphylococcus aureus* type 5, *Staphylococcus aureus* type 8; *Enterococcus faecalis; Enterococcus faecium; Bacillus anthracis; Vibrio cholerae; Pasteurella pestis; Pseudomonas aeruginosa; Campylobacter* spp. such as *jejuni; Clostridium* spp. such as *Clostridium difficile; Mycobacterium* spp. such as *Mycobacterium tuberculosis; Moraxella catarrhalis; Klebsiella pneumoniae; Treponema* spp.; *Borrelia* spp.; *Borrelia burgdorferi; Leptospira* spp.; *Hemophilus ducreyi; Corynebacterium diphtheria; Bordetella pertussis; Bordetella parapertussis; Bordetella bronchiseptica; Ehrlichia* spp.; and *Rickettsia* spp.

In an embodiment, the bacterial polysaccharide is derived from *Streptococcus pneumoniae* serotype selected from the group consisting of, but not limited to, 1, 2, 3, 4, 5, 6, 6A, 6B, 6C, 6D, 6E, 6G, 6H, 7A, 7B, 7C, 7F, 8, 9A, 9L, 9F, 9N, 9V, 10F, 10B, 10C, 10A, 11A, 11F, 11B, 11C, 11D, 11E, 12A, 12B, 12F, 13, 14, 15A, 15C, 15B, 15F, 16A, 16F, 17A, 17F, 18, 18C, 18F, 18A, 18B, 19A, 19B, 19C, 19F, 20, 20A, 20B, 21, 22A, 22F, 23A, 23B, 23F, 24A, 24B, 24F, 25F, 25A, 27, 28F, 28A, 29, 31, 32A, 32F, 33A, 33C, 33D, 33E, 33F, 33B, 34, 45, 38, 35A, 35B, 35C, 35F, 36, 37, 38, 39, 40, 41F, 41A, 42, 43, 44, 45, 46, 47F, 47A, and 48.

The bacteria used in the present disclosure can be sourced from known collection centres, such as CDC, Atlanta USA; CBER/FDA, USA; ATCC, USA; NIH, USA; NIAID, USA; and PHE, UK.

The bacterial culture is subjected to fermentation to obtain a fermentation harvest comprising bacterial cells expressing a polysaccharide. The fermentation is carried out using optimum fermentation parameters, such as medium, pH, temperature, oxygen amount and time period. The fermentation is typically carried out at a pH in the range of 3 to 9, preferably at a pH of 5 to 8.

The bacterial cells in the fermentation harvest are then inactivated. The bacterial cells may be inactivated using known techniques, to release the polysaccharide. In accordance with the embodiments of the present disclosure, inactivation may be carried out using an inactivating agent including detergents (such as deoxycholate sodium (DOC)), enzymes (such as lysozymes), mechanical/physical means (such as sonication), and the like. The fermentation harvest containing the inactivated/lysed bacterial cells may be then centrifuged and filtered.

Centrifugation helps in separation and removal of undesired cell debris, colloids and large aggregates thereby reducing burden on downstream processing. Centrifugation may be carried out 10000 g to 20000 g, 10° C. to 20° C. to obtain cell free supernatant having pH in the range of 5.0 to 7.0, preferably 5.8 to 6.8. In an embodiment, the centrifugation may be carried out for a time period in the range of 20 minutes to 180 minutes.

In a preferred embodiment, the inactivating agent is deoxycholate sodium (DOC).

The cell free supernatant is typically subjected to diafiltration and concentration to obtain crude polysaccharide. In one embodiment, the diafiltration and concentration of harvested supernatant is carried out using 100 kDa cutoff ultrafiltration membrane to obtain crude polysaccharide (pH 5.8 to 7.4). 10× diafiltration (DF) against 150 mM NaCl solution and followed by ~20× DF against WFI to obtain crude polysaccharide having molecular weight in the range of 600 kDa to 1000 kDa.

The crude/native polysaccharide is then treated with an oxidizing agent to obtain purified and sized polysaccharide having reduced molecular weight.

As used in the present disclosure, the term 'sizing/fragmentation/de-polymerization' refers to reducing the size of the bacterial polysaccharide in accordance using the process described herein to obtain a polysaccharide having reduced/desired molecular size as compared to the original polysaccharide.

The inventors of the present disclosure have found that depolymerised/sized polysaccharides have following advantages over plain polysaccharides when used to prepare the conjugates: (a) the conjugates prepared from using depolymerized polysaccharides may be inherently more immunogenic than the corresponding conjugates prepared from full length polysaccharides; and (b) reactions used to prepare these conjugate vaccines can offer a higher degree of control, as well as more versatility in process design, when using depolymerized polysaccharide chains versus full length polysaccharide chains.

The inventors of the present disclosure have further found that it is necessary to reduce the molecular size of the polysaccharide prior to the coupling reaction in order to perform end-group conjugation with high yields. Size reduction of polysaccharides decreases the viscosity of the solution and increases the number of reactive end groups, both factors contribute to an increased frequency of covalent bond formation. Furthermore the optimal immunogenicity of polysaccharide components of conjugate vaccines is said to be related to their molecular size.

In an embodiment of the present disclosure, the oxidizing agent is a peroxide selected from the group including, but not limited to, peroxy acids (such as peracetic acid), $H_2O_2$, metal peroxides (such as barium peroxide, sodium peroxide), and organic peroxides (such as tert-butylhydroperoxide).

In a preferred embodiment of the present disclosure, the peroxide is $H_2O_2$.

The step involves adding a salt to the crude polysaccharide, followed by addition of the oxidizing agent.

Typically, the salt can include, but is not limited to, KCl, NaCl, $CaCl_2$, $MgCl_2$ and $NH_4O$. The final concentration of the salt, can be in the range of 0.5 M to 10 M, preferably 0.5

Nl to 7 M, depending on the salt. The salt is allowed to completely dissolve prior to the addition of the oxidizing agent.

In an embodiment of the present, disclosure, oxidizing agent is then added and the mixture is incubated at a pre-determined temperature for a pre-determined time period to obtain purified polysaccharide having reduced molecular weight.

Typically, the oxidizing agent is added such that the final concentration is in the range 0.5% to 50%, 2% to 50%, 2% to 20%, 5% to 10%, preferably 7.5%.

The mixture containing the oxidizing agent can be incubated at a temperature in the range of 4° C. to 80° C., 4° C. to 70° C., 10° C. to 40° C., 15° C. to 35° C., 25° C. to 35° C., 28° C. to 32° C., preferably 30° C.

The mixture containing oxidizing agent can be incubated for a time period in the range of 2 hours to 15 hours.

In an embodiment of the present disclosure, the incubation is carried out in the presence of a reagent selected from the group comprising buffers, solvents, metal salts, organic acids and mineral acids. The buffer is selected from the group consisting of TRIS, sodium phosphate, sodium acetate; the organic acid is selected from the group consisting of ascorbic acid, acetic acid, citric acid; and the mineral acid is selected from the group consisting of HCl, $H_2SO_4$, TFA, and $HNO_3$.

In an embodiment of the present disclosure, the incubation is carried out in the absence of agitation.

In another embodiment of the present disclosure, the incubation is carried out in the presence of agitation.

The mixture is then centrifuged to obtain clear supernatant and the pellet is discarded. In an embodiment, centrifugation is carried out using a Relative Centrifugal Force (RCF) of 10000 g to 20000 g at a temperature in the range of 2° C. to 20° C. for a time period in the range of 30 minutes to 120 minutes.

The clear supernatant may be further incubated at a temperature in the range of 4° C. to 80° C., for a time period in the range of 2 hours to 15 hours.

In an embodiment of the present disclosure, the incubation is carried out in the absence of agitation.

In another embodiment of the present disclosure, the incubation is carried out in the presence of agitation.

The sized polysaccharide having reduced impurities is typically subjected to diafiltration and concentration to obtain purified and sized polysaccharide. In an embodiment, diafiltration and concentration is carried out using 10 kDa cutoff ultrafiltration membrane against WFI to obtain purified sized polysaccharide (pH 6.8±0.5).

The bacterial polysaccharide is periodically monitored to ascertain/determine the molecular size. Typically, chromatographic techniques, such as Size Exclusion High Performance Liquid Chromatography (SEC-HPLC) are used to ascertain/determine the molecular size of the bacterial polysaccharide. Typically, the average molecular size of the purified and sized bacterial polysaccharide obtained by the method of the present disclosure is in the range of 5 kDa to 900 kDa, 50 kDa to 600 kDa, preferably 50 kDa to 300 kDa, still preferably 50 kDa to 250 kDa. In an exemplary embodiment of the present disclosure, the average molecular size of the purified bacterial polysaccharide is in the range of 100 kDa to 200 kDa.

On the other hand, the method of the present disclosure employs simultaneous purification and sizing of the polysaccharides, and thereby saving time, labour and cost.

The purified and sized bacterial polysaccharide obtained by the method of the present disclosure has optimal characteristics:
- molecular weight in the range of 5 kDa to 900 kDa (as determined by SEC-HPLC);
- polydispersity in the range of 1 to 5, preferably 1 to 3;
- hexosamine content between 10% and 55%, 10% to 40%, preferably between 30% and 45%;
- immunoreactivity in the range of 40% to 95%, preferably between 45% and 90%;
- protein content less than 2%;
- nucleic acid content less than 2%;
- pyruvate content greater than 10%, preferably 10% to 20%; and
- % yield of polysaccharide in the range of 60% to 95%, preferably between 70% and 90%.

Typically, the recovery of purified polysaccharides using the method of the present disclosure is more than 70% compared to about 55% recovery of polysaccharides reported in literature.

Further, the method of the present disclosure is capable of substantially reducing impurities from the bacterial polysaccharide. In an embodiment, the impurities are reduced to, i.e., proteins to less than 0.2% and nucleic acids to less than 0.3% from 15% and 25%, respectively.

The method of the present disclosure using an oxidizing agent for simultaneous sizing and removal of impurities makes it possible to obtain purified and sized polysaccharides having optimal pyruvate content and hence maintains CPS integrity, confers enhanced stability and immunogenicity to the polysaccharide and conjugate obtained thereof. The method of the present disclosure is also devoid of costly chromatography steps that makes it economical for large scale manufacturing.

The present disclosure provides low polydispersity polysaccharide, wherein such low polydispersity polysaccharide (CPS) gives conjugate with narrow distribution of size. This helps to have better conjugation process control, higher recoveries when concentrated on a membrane as well as ease in purification of crude polysaccharide protein conjugate. Most importantly by applicant's method the polysaccharide antigen remains structurally intact, i.e. the epitopic conformation is retained which ensures that resultant polysaccharide-protein conjugate shows optimal immunogenicity In another embodiment of the present disclosure, the crude bacterial polysaccharide may be subjected to additional purification steps before treatment with the oxidizing agent.

In an embodiment of the present disclosure, the method may comprise any subset or all of the following steps before treatment with the oxidizing agent:
- treating the crude/native polysaccharide with an enzyme to remove impurities;
- acid precipitation of impurities;
- separation of the precipitation, followed by centrifugation to obtain a supernatant;
- subjecting the supernatant to further purification using a chromatographic method; and
- diafiltration and concentration of the chromatographic flowthrough to obtain purified native polysaccharide.

In an embodiment of the present disclosure, the method does not utilize any additional step of chromatography, alcohol, detergent and enzymes.

In another embodiment of the present disclosure, the method utilizes one or more additional steps of chromatography, alcohol, detergent and enzymes.

The crude polysaccharide is treated with an enzyme, such as protease, benzonase to remove impurities. The enzyme treatment can be carried out at a pH in the range of 7.0 to 8.5, in the presence of an acid and a salt. The concentration of the enzyme can be in the range of 2 IU/ml to 20 IU/ml. In an embodiment, the acid may be Tris HCl having a concentration in the range of 5 mM to 50 mM. The salt is selected from NaCl, $CaCl_2$, $MgCl_2$, and has a concentration in the range of 0.5 mM to 1 mM. The enzyme treatment can be carried at a temperature in the range of 36° C. to 38° C. and for a time period of 5 hours to 15 hours.

Thereafter, the mixture is precipitated using 10% to 30% acid. In an embodiment, the acid is a mineral acid, such as HCl, $HNO_3$, and $H_2SO_4$. The pH is adjusted to 5 to 8 using the acid to precipitate the impurities.

Thereafter, the precipitated impurities are separated by centrifugation and the supernatant comprising the polysaccharide is collected for further processing.

The supernatant comprising the polysaccharide is subjected to additional purification using chromatographic techniques. In an embodiment, the supernatant comprising the polysaccharide is subjected to Hydrophobic Interaction Chromatography (HIC), Ion Exchange Chromatography. In a preferred embodiment, the HIC resin is Octyl Sepharose 4FF having pH in the range of 6 to 7.5.

The HIC flowthrough is diafiltered and concentrated. In an embodiment, the HIC flowthrough is diafiltered and concentrated using 100 kDa cutoff ultrafiltration membrane to obtain purified native polysaccharide (pH 6.5±0.5), which is then subjected to treatment with an oxidizing agent as described previously.

In yet another embodiment, the method of the present disclosure may include at least one of the following at any stage of the method of the present invention to obtain the sized and purified bacterial polysaccharide:
- treatment with reagents, such as cetyl trimethyl ammonium bromide (CTAB), hexadimethrine bromide and myristyltrimethylammonium, triton, acetate (such as ethyl acetate, sodium acetate, barium acetate, calcium acetate, ammonium acetate, cupric acetate), sodium carbonate, zinc, enzymes (protease, endonuclease, DNase, RNase, benzonase, mutanolysin/lysozyme, beta.-D-N-acetyl glucosaminidase, and proteinase K), ethanol, acetone, $CaCl_2$, sodium dodecyl sulfate (SDS), polysorbate 20, polysorbate 80, sodium sarcosine, NaCl, urea, formaldehyde, ammonium chloride, ethylenediaminetetraacetic acid (EDTA), ammonium sulfate, mineral acid (such as HCl, $H_2SO_4$, $HNO_3$, TCA), organic acid (such as formic acid, acetic acid, propionic acid, and oxalic acid), iso propanol, metal cations (such as Ca, Mg, Mn, Fe, Cu, Co, Mo), butanol, toluene and chloroform, alkali (such as sodium hydroxide, potassium hydroxide, sodium carbonate, hydroxyl amine, triethyl amine and lithium hydroxide), ascorbic acid, tetrabutylammonium, potassium chloride, alkyl sulfates, sodium deoxycholate, sodium dodecyl sulfonate, sodium s-alkyl sulfates, sodium fatty alcohol polyoxyethylene ether sulfates, sodium oleyl sulfate, N-oleoyl poly (amino acid) sodium, sodium alkylbenzene sulfonates, sodium α-olefin sulfonates, sodium alkyl sulfonates, α-sulfo monocarboxylic acid esters, fatty acid sulfoalkyl esters, succinate sulfonate, alkyl naphthalene sulfonates, sodium alkane sulfonates, sodium ligninsulfonate, and sodium alkyl glyceryl ether sulfonates;
- chromatographic steps, such as affinity chromatography, hydrophilic-interaction, hydrophobic-interaction, size-exclusion, ion exchange chromatography (cationic or anionic), Cibacron Blue pseudo affinity sorbent, mixed mode chromatography sorbent, membrane chromatography, monolith chromatography device, adsorbent chromatography, lectin agarose column, hydroxyapatite chromatography, Amberlite column, gel-permeation chromatography, Capto Adhere, TOYOPEARL MX-Trp-650M, Cellufine MAX AminoButyl, adsorbent chromatography; and filtration methods such as depth filtration, carbon filtration, ultrafiltration, gel filtration.

The bacterial polysaccharides obtained by the method of the present disclosure may be used as antigens, or may be used for production of antibodies, and vaccines. The polysaccharides may be used alone or may be conjugated to carrier protein. Still further, the polysaccharides exhibit enhanced immunogenicity and stability when compared with polysaccharides prepared using conventional methods.

The present disclosure envisages a bacterial polysaccharide having molecular weight in the range of 5 kDa to 900 kDa (SEC-HPLC), polydispersity in the range of 1 to 5, hexosamine content between 10% and 55%, pyruvate content greater than 10%, protein content less than 2%, nucleic acid content less than 2%, immunoreactivity in the range of 40% to 95%, and % yield of polysaccharide in the range of 60% to 95%.

In an embodiment of the present disclosure, the molecular size of the bacterial polysaccharide is in the range of 100 kDa to 300 kDa (SEC-HPLC).

In yet another embodiment, the bacterial polysaccharide is used for preparation of polysaccharide-protein conjugate vaccine.

In an embodiment of the present disclosure, S. pneumoniae serotype 4 polysaccharide obtained by the method of the present disclosure has a pyruvate content of at least 16% and hexosamine content in the range of 30% to 45%.

In accordance with the embodiments of the present disclosure, the polysaccharides obtained by the method of the present disclosure may be conjugated to a peptide, a protein or an organic polymer, preferably a carrier protein selected from the group consisting of Tetanus toxoid (TT), $CRM_{197}$ (Cross Reactive Material 197, a genetically detoxified form of diphtheria toxoid), Diphtheria toxoid (DT), Neisseria meningitidis outer membrane complex, fragment C of tetanus toxoid, pertussis toxoid, protein D of H. influenzae, E. coli LT, E. coli ST, and exotoxin A from Pseudomonas aeruginosa, outer membrane complex c (OMPC), porins, transferrin binding proteins, pneumolysin, pneumococcal surface protein A (PspA), pneumococcal surface adhesin A (PsaA), pneumococcal PhtD, pneumococcal surface proteins BVH-3 and BVH-11, protective antigen (PA) of Bacillus anthracis and detoxified edema factor (EF) and lethal factor (LF) of Bacillus anthracis, ovalbumin, keyhole limpet hemocyanin (KLH), human serum albumin (HSA), bovine serum albumin (BSA) and purified protein derivative of tuberculin (PPD), cholera toxin B, synthetic peptides, heat shock proteins, pertussis proteins, cytokines, lymphokines, hormones, growth factors, artificial proteins comprising multiple human CD4+ T cell epitopes from various pathogen-derived antigens such as N 19, iron-uptake proteins, toxin A or B from C. difficile and S. agalactiae proteins or any equivalents thereof.

Typically, the polysaccharide of the present disclosure may be conjugated to the carrier protein using an appropriate conjugation chemistry, including, but not limited to, cyanylation chemistry, CNBr chemistry, reductive amination chemistry, and carbodiimide chemistry. The cyanylation agent may include, but is not limited to, 1-cyano-4-dimethylaminopyridinium tetrafluroborate (CDAP), 1-cyano-4-pyrrolidinopyridinium tetrafluorborate (CPPT), 1-cyanoimidazole (1-CI), 1-cyanobenzotriazole (1-CBT), 2-cyanopyridazine-3(2H)one (2-CPO), and a functional derivative or modification thereof. Typically the conjugates prepared using the polysaccharides obtained using the method of the present disclosure have free polysaccharide less than 3.5% and free protein less than 1.8%.

In one embodiment of the present disclosure, the polysaccharide is conjugated to the carrier protein in the presence of a linker. The linker may be selected from the group comprising hexanediamine, ethylene diamine, hydrazine, adipic dihydrazide, and 1,6-diaminooxyhexane.

In another embodiment of the present disclosure, the polysaccharide is conjugated to the carrier protein in the absence of a linker.

Purified and sized polysaccharide of the present disclosure may also be used as a plain polysaccharide vaccine.

In a preferred embodiment, vaccine compositions are "Monovalent" or "Multivalent" polysaccharide-protein conjugate vaccine compositions prepared using the polysaccharides of the present disclosure are single dose compositions free of preservatives.

Conjugates obtained by the present disclosure may be further combined with heat shock proteins (HSPs), and whole cell for preparing S. pneumoniae vaccine composition.

The present disclosure envisages immunogenic compositions comprising one of 7, 8, 9, 10, 11, 12, 13, 14, 15, 16, 17, 18, 19, 20, 21, 22, 23, 24, 25, 26, 27, 28, 29, and 30-valent pneumococcal protein—conjugate composition.

The present disclosure envisages an immunogenic composition comprising Streptococcus pneumoniae polysaccharides, wherein the polysaccharide is obtained by the method of the present disclosure. The polysaccharides have a molecular weight in the range of 5 kDa to 900 kDa (SEC-HPLC), polydispersity in the range of 1 to 5, hexosamine content between 10% and 55%, pyruvate content greater than 10%, protein content less than 2%, nucleic acid content less than 2%, immunoreactivity in the range of 40% to 95%, and % yield of polysaccharide in the range of 60% to 95% and the polysaccharides are derived from Streptococcus pneumoniae serotypes selected from the group consisting of 1, 2, 3, 4, 5, 6, 6A, 6B, 6C, 6D, 6E, 6G, 6H, 7A, 7B, 7C, 7F, 8, 9A, 9L, 9F, 9N, 9V, 10F, 10B, 10C, 10A, 11A, 11F, 11B, 11C, 11D, 11E, 12A, 12B, 12F, 13, 14, 15A, 15C, 15B, 15F, 16A, 16F, 17A, 17F, 18, 18C, 18F, 18A, 18B, 19A, 19B, 19C, 19F, 20, 20A, 20B, 21, 22A, 22F, 23A, 23B, 23F, 24A, 24B, 24F, 25F, 25A, 27, 28F, 28A, 29, 31, 32A, 32F, 33A, 33C, 33D, 33E, 33F, 33B, 34, 45, 38, 35A, 35B, 35C, 35F, 36, 37, 38, 39, 40, 41F, 41A, 42, 43, 44, 45, 46, 47F, 47A, and 48.

In an embodiment of the present disclosure, there is provided an immunogenic composition comprising 10 distinct Streptococcus pneumoniae polysaccharide—protein conjugates. The polysaccharides are obtained by the method of the present disclosure having molecular weight in the range of 5 kDa to 900 kDa (SEC-HPLC), polydispersity in the range of 1 to 5, protein content less than 2%, nucleic acid content less than 2%, immunoreactivity in the range of 40% to 95%, and % yield of polysaccharide in the range of 60% to 95%. The polysaccharides are derived from Streptococcus pneumoniae serotypes 1, 5, 6A, 6B, 7F, 9V, 14, 19A, 19F and 23F; and all the polysaccharides are conjugated to $CRM_{197}$ as the carrier protein.

In another embodiment of the present disclosure, there is provided an immunogenic composition comprising 17 distinct *Streptococcus pneumoniae* polysaccharide—protein conjugates. The polysaccharides are obtained by the method of the present disclosure having molecular size in the range of 5 kDa to 900 kDa (SEC-HPLC), polydispersity in the range of 1 to 5, protein content less than 3%, nucleic acid content less than 2%, immunoreactivity in the range of 40% to 95%, and % yield of polysaccharide in the range of 60% to 95%. The polysaccharides are derived from *Streptococcus pneumoniae* serotypes 1, 2, 3, 4, 5, 6A, 6B, 7F, 9V, 12F, 14, 15B, 18C, 19A, 19F, 22F and 23F; wherein serotype 3 is conjugated to $CRM_{197}$, serotype 18C is conjugated to $CRM_{197}$, serotype 4 is conjugated to DT, serotype 15B is conjugated either to TT, DT or $CRM_{197}$, and serotype 22F is conjugated to TT.

Typically, the immunogenic composition comprises pharmaceutically acceptable excipients selected from surfactants, stabilizers, buffers, diluents, adjuvants, preservatives and solvents.

In another embodiment, compositions prepared using the polysaccharides of the present disclosure are multi-dose compositions comprising at least one preservative. The preservative may be selected from the group comprising 2-phenoxyethanol, benzethonium chloride (Phemerol), phenol, m-cresol, thiomersal, formaldehyde, methyl paraben, propyl paraben, benzalkonium chloride, benzyl alcohol, chlorobutanol, p-chlor-m-cresol, benzyl alcohol and combinations thereof.

The method of the present disclosure is cost effective with high recovery of sized and purified polysaccharides, and can be performed very easily.

The present disclosure is further described in light of the following examples which are set forth for illustration purpose only and not to be construed for limiting the scope of the disclosure.

EXAMPLES

The *Streptococcus pneumoniae* serotypes 4 and 1 were sourced from Centers for Disease Control and Prevention (CDC), Atlanta, USA.

U.S. Pat. No. 9,249,439 is being incorporated with reference to the fermentation processes utilized for all *S. pneumoniae* serotypes Example-1: Obtaining Fragmented and Purified Polysaccharide from *Streptococcus Pneumoniae* Serotype 4 in Accordance with the Method of the Present Disclosure The method for obtaining fragmented and purified polysaccharide in accordance with the present disclosure comprised the following steps:

Fermentation process was carried out at pH 7.1±0.5.

The fermentation harvest comprising *S. pneumoniae* serotype 4 cells were inactivated using DOC [12% stock solution was used, which was added in fermenter to make the final concentration of 2.5%], followed by centrifugation (at 15000 g, 15° C., 60 minutes) to get cell free supernatant harvest (pH 5.8 to 6.8).

The cell free supernatant harvest was diafiltered and concentrated using 100 kDa cutoff ultrafiltration membrane to obtain crude polysaccharide (pH 5.8 to 7.4). 10× DF against 150 mM NaCl solution and followed by ~20× DF against WFI. Molecular weight of crude polysaccharide is ~1000 kDa to 600 kDa.

$H_2O_2$ treatment was carried out for size reduction of crude polysaccharide: in crude native polysaccharide by adding 2M equivalent solid NaCl and dissolving it completely, followed by addition of 25% (v/v) equivalent $H_2O_2$ (stock concentration 30%) such that the final concentration of $H_2O_2$. is ~7.5%, (pH 6.2±0.5).

The mixture obtained in the above step is incubated at 30° C.±1.0° C., without agitation.

After incubation, the reaction mixture was centrifuged (RCF=15000 g, ~60 minutes, 10° C.) to get precipitate free clear supernatant.

After centrifugation, the supernatant was collected and the precipitated pellet was discarded.

The supernatant is further incubated at 30° C.±1.0° C., without agitation.

After 2 hours to 5 hours OR on achieving the desired molecular weight (i.e. 150±50 kDa), the reaction mixture was diafiltered and concentrated using 10 kDa cutoff ultrafiltration membrane to obtain fragmented/sized and purified polysaccharide (pH 6.8±0.5).

The sized and purified polysaccharide was characterized and the results obtained are illustrated in Table-1:

TABLE 1

| S. No. | Experimental data specifications for Serotype 4 sized and purified polysaccharide | |
|---|---|---|
| 1) | Mw by SEC-HPLC (kDa) | 700 ± 50 kDa to 150 ± 50 kDa |
| 2) | Polydispersity | 2.0 ± 0.5 |
| 3) | Pyruvate content | 16 ± 2% |
| 4) | Hexosamine | 40 ± 2% |

Further, the experimental data specification for Serotype 4 conjugate is provided in Table-1a:

TABLE 1a

| S. No. | Experimental data specifications for Serotype 4 conjugate | |
|---|---|---|
| 1) | Mw by SEC-HPLC (kDa) | 850 ± 60 kDa |
| 2) | Polydispersity | 3.1 ± 0.2 |
| 3) | Pyruvate content | 16 ± 2% |
| 4) | Conjugate stability | Stable |
| 5) | Conjugate immunogenicity | Passes |
| 6) | Free Ps (%) | <3.15 |
| 7) | Free protein (%) | <1.8 |

Similarly purified polysaccharide from serotype 1 was also obtained using the method of the present disclosure.

NMR analysis of the purified polysaccharides was carried out and the results obtained are illustrated in FIGS. 1-4.

Figure 2:
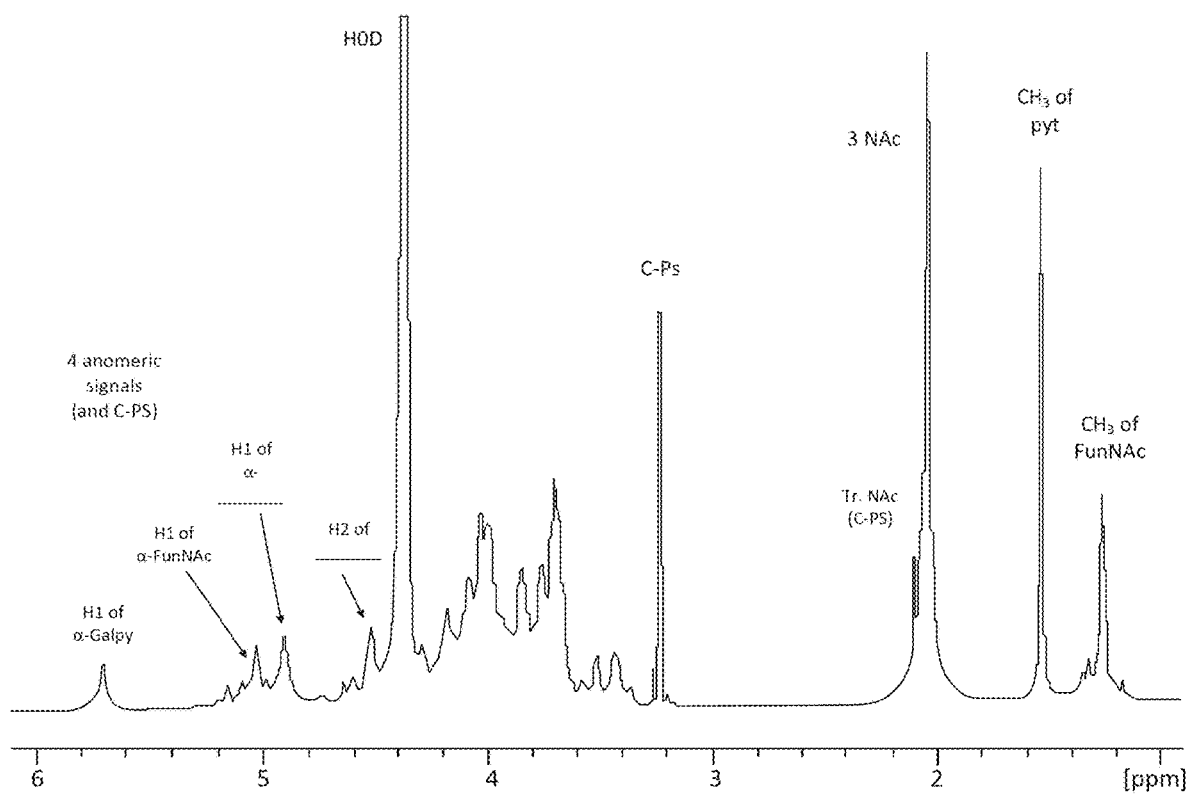
FIG. 2 illustrates the $^1H$ NMR spectrum purified S. pneumoniae polysaccharide for serotype 4 obtained by the method of present disclosure.
Figure 3:
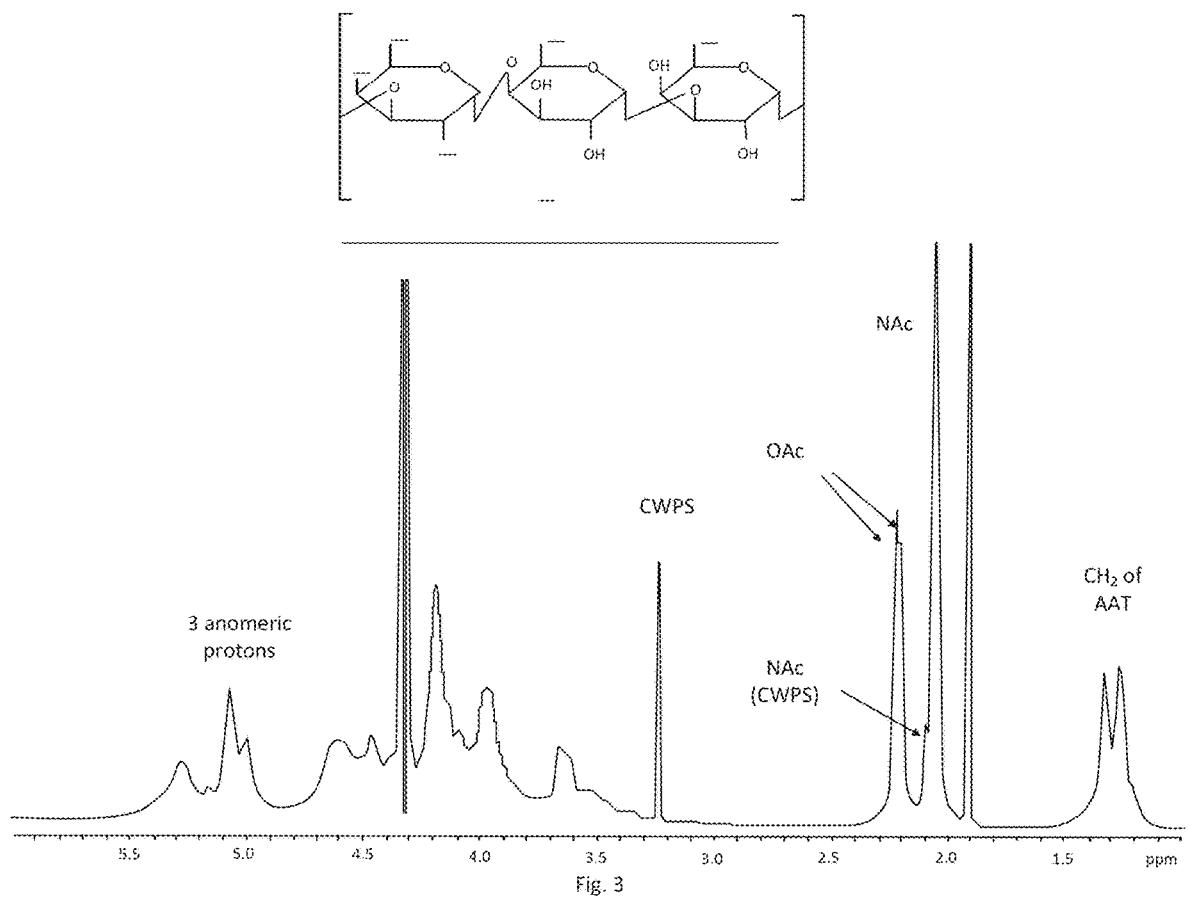
FIG. 3 illustrates the literature spectrum of purified S. pneumoniae polysaccharide for serotype 1.

Figure-1 illustrates the literature $^1H$ NMR spectrum of purified *S. pneumoniae* polysaccharide for serotype 4, and Figure-2 illustrates the $^1H$ NMR spectrum purified *S. pneumoniae* polysaccharide for serotype 4 obtained by the method of present disclosure.

Interpretation of NMR Analysis of Serotype 4:

The method is based on 600 MHz proton NMR spectra of individual serotype-specific polysaccharide. A portion of the anomeric region of each spectrum (4.5 to 6.0 ppm) is compared to spectra generated for designated reference samples for each polysaccharide of interest. The selected region offers a spectral window that is unique to a given polysaccharide and is sensitive to any structural alteration of the repeating units.

Anomeric Center:

Typically the chemical shifts for anomeric protons found further downfield (higher ppm) on the NMR spectrum than other ring protons, generally 4-6 ppm. Because of their distinctive shifts, these signals are generally the most diagnostic component of the $^1$H NMR spectrum.

Identity of Serotype 4 Polysaccharide by 1D Proton NMR

Pneumococcal polysaccharide of serotype 4 is a tetrasaccharide repeating unit having 4 anomeric signals or protons. 1D Proton NMR spectra of ATCC 4 pneumococcal polysaccharide (PnPs) (Figure-1) was compared to PnPs NMR spectrum obtained for serotype 4 polysaccharide obtained by method of present disclosure (Figure-2). Spectra looks similar to each other with respect to anomeric region (4.5-6.0 ppm), N-acetyl Fucose at 1.25 ppm, Pyruvate at 1.5-1.6 ppm, N-acetyl at 1.9-2.1 ppm and -PCho peak (3.23 ppm) which represents the presence of C-Ps in PnPs preparation.

Therefore, identity of PnPs for serotype 4 obtained by the method of the present disclosure was confirmed by comparing the ATCC PnPs as reference standard by proton NMR with peaks identification.

Interpretation of NMR Analysis of Serotype 1:

The method is based on 600 MHz proton NMR spectra of individual serotype-specific polysaccharide. A portion of the anomeric region of each spectrum (4.5 to 6.0 ppm) is compared to spectra generated for designated reference samples for each polysaccharide of interest. The selected region offers a spectral window that is unique to a given polysaccharide and is sensitive to any structural alteration of the repeating units.

Anomeric Center:

Typically the chemical shifts for anomeric protons found further downfield (higher ppm) on the NMR spectrum than other ring protons, generally 4-6 ppm. Because of their distinctive shifts, these signals are generally the most diagnostic component of the $^1$H NMR spectrum.

Identity of Serotype 1 Polysaccharide by 1D Proton NMR

1D Proton NMR spectra of ATCC 1 PnPs were compared to PnPs for serotype 1 polysaccharide obtained by the method of present disclosure. Spectra looks similar to each other with respect to anomeric region (4.5-6.0 ppm), N-acetyl and O-acetyl signal at 1.9-2.1 ppm and -PCho peak (3.23 ppm) which represents the presence of C-Ps in PnPs preparation.

Therefore, identity of PnPs for serotype 1 obtained by the method of the present disclosure was confirmed by comparing the ATCC PnPs as reference standard by proton NMR with peaks identification.

Figure 4:
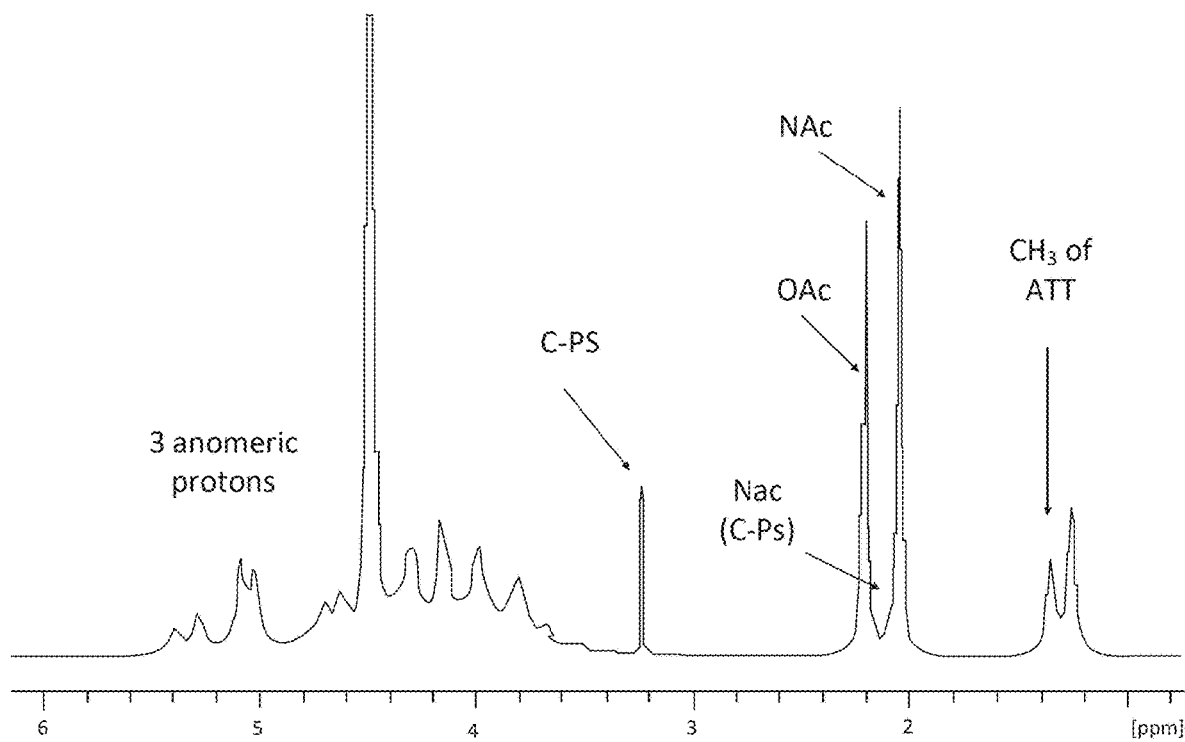
FIG. 4 illustrates the $^1H$ NMR spectrum of purified S. pneumoniae polysaccharide for serotype 1 obtained by the method of present disclosure.

Pneumococcal polysaccharide of serotype 1 is a trisaccharide repeating unit having 3 anomeric signals or protons. 1D Proton NMR spectra of ATCC 1 PnPs (Figure-3) was compared to PnPs NMR spectrum obtained for serotype 1 polysaccharide by method of the present disclosure (Figure-4). Spectra looks similar to each other with respect to anomeric region (4.5-6.0 ppm), N-acetyl and O-acetyl signal at 1.9-2.1 ppm and -PCho peak (3.23 ppm) which represents the presence of C-Ps in PnPs preparation Therefore, identity of PnPs obtained by method of present disclosure for serotype 1 was confirmed by comparing the ATCC PnPs as reference standard by proton NMR with peaks identification.

It is seen from Table-1 that the free protein and free polysaccharide content for the conjugates prepared using the polysaccharides prepared in accordance with the method of present disclosure is within the specified limits and hence the conjugates are stable.

Similar results were obtained for *S. pneumoniae* serotype 1 purified and sized polysaccharide using the method of the present disclosure. Experiments were also carried out using different concentrations of $H_2O_2$. It was seen that at concentrations of 0.5%, 1% and 3% only moderate changes in molecular impurity (protein and nucleic acid) profile was observed which does not meet the quality criteria specified by WHO-TRS/pharmacopeia. Also the rate of depolymerization/sizing of polysaccharide is slow as compared to optimal $H_2O_2$ concentration of 7.5% in accordance with the present disclosure. At concentration 5% $H_2O_2$, similar result as for 7% was observed. On the other hand, at concentrations of 10%, 30-50%, 35% $H_2O_2$, the rate of polysaccharide depolymerization increases, however very low recovery of polysaccharide is observed.

Experiments were carried out using different temperature during incubation after addition of $H_2O_2$. It was seen that at 15° C. the rate of polysaccharide depolymerization is slow but the results are similar that of 30° C. At 45° C., 50° C., 60° C., 70° C., 80° C. the rate of polysaccharide depolymerization increases as temperature increases, however, very low recovery of polysaccharide was observed.

Example-2: Obtaining Fragmented and Purified Polysaccharide from *Streptococcus Pneumoniae* Serotype 4 Using Benzonase+Hydrophobic Interaction Chromatography (HIC)

The method for obtaining fragmented and purified polysaccharide using benzonase+HIC comprised the following steps:

Fermentation process was carried out at pH 7.1±0.5.

The fermentation harvest comprising *S. pneumoniae* serotype 4 cells were inactivated using DOC [12% stock solution was used, which was added in fermenter to make the final concentration of 2.5%], followed by centrifugation (at 15000 g, 15° C., 60 minutes) to get cell free supernatant harvest (pH 5.8 to 6.8).

The cell free supernatant harvest was diafiltered and concentrated using 100 kDa cutoff ultrafiltration membrane to obtain crude polysaccharide (pH 5.8 to 7.4). 10× DF against 150 mM NaCl solution and followed by ~20× DF against WFI. Molecular weight of crude polysaccharide was ~1000 kDa to 600 kDa.

Benzonase treatment to crude polysaccharide (pH 8.0±0.2): Reaction mixture consisting crude pneumococcal polysaccharide+Benzonase at concentration of 10 IU/mL+Tris HCl at concentration of 20 mM+$MgCl_2$ at concentration of 2 mM for 10±2 hours at 37° C.

Impurities were precipitated by adjusting the pH 5.8±0.2 using 20% HCl.

The precipitate was separated by centrifugation and supernatant was collected.

The supernatant was further purified using Hydrophobic interaction chromatography (HIC resin is Octyl sepharose 4FF) (pH 6.8±0.5).

The HIC flowthrough was diafiltered and concentrated using 100 kDa cutoff ultrafiltration membrane to obtain purified native polysaccharide (pH 6.5±0.5).

$H_2O_2$ treatment was carried out for size reduction of crude polysaccharide: in crude native polysaccharide by adding 2M equivalent solid NaCl and dissolving it completely, followed by addition of 25% (v/v) equivalent $H_2O_2$ (stock concentration 30%) such that the final concentration of $H_2O_2$. is ~7.5%, (pH 6.2±0.5).

The mixture obtained in the above step was incubated at 30° C.±1.0° C., without agitation.

After incubation, the reaction mixture was centrifuged (RCF=15000 g, —60 minutes, 10° C.) to get precipitate free clear supernatant.

After centrifugation, the supernatant was collected and the precipitated pellet was discarded.

The supernatant was further incubated at 30° C.±1.0° C., without agitation.

After 2 hours to 5 hours OR on achieving the desired molecular weight (i.e. 150±50 kDa), the reaction mixture was diafiltered and concentrated using 10 kDa cutoff ultrafiltration membrane to obtain fragmented/sized and purified polysaccharide (pH 6.8±0.5).

Experiments were carried out by varying the concentration of benzonase, it was observed that benzonase 5 to 10 IU and higher concentrations were effective in removing the DNA impurity. Further, it was found that $MgCl_2$ was essential for activity of benzonase, in absence of $MgCl_2$ the enzymatic activity was not observed but in presence of $MgCl_2$ the enzymatic activity was found to be satisfactory and resulted in efficient removal of DNA impurity. The effect of different incubation duration [2 hours to 10 hours] on DNA impurity removal was studies. It was observed from the results obtained that on 10 hours incubation, DNA impurity was not detected; whereas below 9 hours DNA impurity was detected. Hence, it was concluded that, as the duration of incubation increases, DNA impurity concentration decreases.

TECHNICAL ADVANTAGES

The method for obtaining purified and sized bacterial polysaccharides of the present disclosure described herein above has several technical advantages including, but not limited to, the realization of:

a method for purification of bacterial polysaccharides with high recovery and low impurity content;

obtaining purified and sized polysaccharides having;
  molecular weight in the range of 5 kDa to 900 kDa (as determined by SEC-HPLC);
  polydispersity in the range of 1 to 5, preferably 1 to 3;
  hexosamine content between 10% and 55%, 10% to 40%, preferably between 30% and 45%;
  immunoreactivity in the range of 40% to 95%, preferably 45% to 90%;
  protein content less than 2%;
  nucleic acid content less than 2%;
  pyruvate content greater than 10%, preferably 10% to 20%; and
  % yield of polysaccharide in the range of 60% to 95%, preferably 70% and 90%.

obtaining purified bacterial polysaccharide having high polysaccharide recovery (at least 60%) and low impurity content (proteins 0.2% and nucleic acids 0.3%); and simple, rapid and cost effective method for purification of bacterial polysaccharides that does not utilize phenol, triton, enzymes, CTAB, activated carbon, chromatography (such as HIC), ammonium sulphate or ethanol.

The foregoing description of the specific embodiments fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein has been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired object or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values ten percent higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A method for simultaneous fragmentation and purification of bacterial polysaccharides, the method comprising the following steps:
   (a) providing a fermentation harvest comprising bacterial cells expressing a polysaccharide;
   (b) inactivating the bacterial cells in the fermentation harvest by adding an inactivating agent including deoxycholate sodium (DOC) to the fermentation harvest;
   (c) subjecting the fermentation harvest comprising the inactivated bacterial cells of step (b) to centrifugation at 10,000 g to 20,000 g and at a temperature in the range of 10° C. to 20° C. to separate cell free supernatant;
   (d) concentrating and filtering the cell free supernatant of step (c);
   (e) treating the concentrated and filtered cell free supernatant of step (d) with an oxidizing agent including $H_2O_2$ having a final concentration in the range of 5% to 10% at a temperature in the range of 28° C. to 32° C. and incubating for a time period in the range of 2 hours to 15 hours;
   (f) subjecting the oxidizing agent treated mixture of step (e) to centrifugation to remove precipitated impurities and collect supernatant; and (g) diafiltering and concentrating the supernatant of step (f) to obtain a purified and sized polysaccharide having a molecular weight in the range of 5 kDa to 900 kDa (SEC-HPLC), a polydispersity in the range of 1 to 5, a hexosamine content between 10% and 55%, a pyruvate content greater than 10%, a protein content less than 2%, a nucleic acid content less than 2%, an immunoreactivity in the range of 40% to 95%, and a percentage yield of polysaccharide in the range of 60% to 95% wherein the bacterial polysaccharide is derived from *Streptococcus pneumoniae* serotype 4.

2. The method as claimed in claim 1, wherein the pH of the fermentation harvest is in the range of 5 to 8.

3. The method as claimed in claim 1, wherein step (e) is carried out in the presence of a reagent selected from the group consisting of buffers, solvents, metal salts, organic acids and mineral acids.

4. The method as claimed in claim 3, wherein the buffer is selected from the group consisting of TRIS, sodium phosphate, sodium acetate; the organic acid is selected from the group consisting of ascorbic acid, acetic acid, citric acid; and the mineral acid is selected from the group consisting of HCl, $H_2SO_4$, TFA, and $HNO_3$.

5. The method as claimed in claim 1, wherein the molecular size of the purified and sized bacterial polysaccharides is in the range of 50 kDa to 300 kDa.

6. The method as claimed in claim 1, wherein the inactivating agent is selected from the group consisting of detergents, enzymes, mechanical inactivating agents and physical inactivating agents.

7. The method as claimed in claim 1, wherein the filtration in step (d) is carried out on 100 kDa ultrafiltration membrane at a pH in the range of 5.5 to 8 and the diafiltration in step (g) is carried out on 10 kDa ultrafiltration membrane at a pH in the range of 6.3 to 7.3.

8. The method as claimed in claim 1, wherein step (e) is carried out in the absence of agitation.

9. The method as claimed in claim 1, wherein a salt selected from the group consisting of KCl, NaCl, $CaCl_2$, $MgCl_2$ and $NH_4Cl$ is added prior to the treatment with an oxidizing agent in step (e), and wherein the final concentration of the salt is in the range of 0.5 M to 10 M.

10. The method as claimed in claim 1, wherein the supernatant of step (f) is incubated at a temperature in the range of 4° C. to 80° C., for a time period in the range of 2 hours to 15 hours.

11. The method as claimed in claim 10, wherein the incubation is carried out in the absence of agitation.

12. The method as claimed in claim 1, wherein the method does not utilize any chromatography, alcohol, detergent and enzymes.

13. The method as claimed in claim 1, wherein the method utilizes one or more of chromatography, alcohol, detergent and enzymes.

14. The method as claimed in claim 13, wherein the method comprises an additional step of chromatography to obtain the purified and sized polysaccharide, wherein the chromatography is selected from the group consisting of ion-exchange (cationic or anionic), affinity chromatography, hydrophilic-interaction, hydrophobic-interaction, size-exclusion, hydroxyapatite, gel-permeation chromatography, Cibacron Blue pseudo affinity sorbent, mixed mode chromatography sorbent, membrane chromatography, Capto Adhere, TOYOPEARL MX-Trp-650M, Cellufine MAX AminoButyl, monolith chromatography device, adsorbent chromatography, lectin agarose column, and Amberlite column.

15. The method as claimed in claim 13, wherein the method comprises an additional step of treatment with one or more chemical/biological reagents at any stage of the method, selected from the group consisting of cetyl trimethyl ammonium bromide (CTAB), hexadimethrine bromide and myristyltrimethylammonium, triton, acetate, sodium carbonate, zinc, enzymes, alcohol (Ethanol, Isopropanol), phenol, acetone, salts (magnesium, calcium), sodium dodecyl sulfate (SDS), polysorbates, sodium sarcosine, NaCl, urea, formaldehyde, ammonium chloride, ethylenediaminetetraacetic acid (EDTA), ammonium sulfate, mineral acid, organic acid, metal cations, toluene, chloroform, alkali, ascorbic acid, tetrabutylammonium, potassium chloride, alkyl sulfates, sodium deoxycholate, sodium dodecyl sulfonate, sodium s-alkyl sulfates, sodium fatty alcohol polyoxyethylene ether sulfates, sodium oleyl sulfate, N-oleoyl poly (amino acid) sodium, sodium alkylbenzene sulfonates, sodium α-olefin sulfonates, sodium alkyl sulfonates, α-sulfo monocarboxylic acid esters, fatty acid sulfoalkyl esters, succinate sulfonate, alkyl naphthalene sulfonates, sodium alkane sulfonates, sodium ligninsulfonate, and sodium alkyl glyceryl ether sulfonates, DNase, RNase, Benzonase, Mutanolysin/lysozyme, beta.-D-N-acetyl glucosaminidase, and Proteinase K.

16. The method as claimed in claim 1, wherein the cell free supernatant of step (d) is treated with Benzonase at a concentration of 10 IU/mL mixed with Tris HCL at a concentration of 20 mM and $MgCl_2$ at a concentration of 2 mM for 10±2 hours at 37° C., and then subjected to hydrophilic-interaction chromatography before treating the cell free supernatant with $H_2O_2$ in step (e).

* * * * *